(12) United States Patent
Murai et al.

(10) Patent No.: US 9,899,647 B2
(45) Date of Patent: Feb. 20, 2018

(54) ONBOARD POWER SUPPLY APPARATUS

(71) Applicants: TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

(72) Inventors: Daisuke Murai, Toyota (JP); Nobuyoshi Fujiwara, Toyota (JP); Ikkei Ohgitani, Obu (JP)

(73) Assignees: TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/518,941

(22) PCT Filed: Oct. 13, 2015

(86) PCT No.: PCT/IB2015/001867
§ 371 (c)(1),
(2) Date: Apr. 13, 2017

(87) PCT Pub. No.: WO2016/059461
PCT Pub. Date: Apr. 21, 2016

(65) Prior Publication Data
US 2017/0222200 A1 Aug. 3, 2017

(30) Foreign Application Priority Data
Oct. 15, 2014 (JP) .................... 2014-210903

(51) Int. Cl.
*B60R 16/04* (2006.01)
*H01M 2/20* (2006.01)
(Continued)

(52) U.S. Cl.
CPC .......... *H01M 2/1077* (2013.01); *B60R 16/04* (2013.01); *H01M 2/1083* (2013.01);
(Continued)

(58) Field of Classification Search
CPC ............. H01M 2/1077; H01M 2/1083; H01M 2/1072; H01M 2/206; H01M 2/20;
(Continued)

(56) References Cited

U.S. PATENT DOCUMENTS 8,632,905 B2 * 1/2014 Yasui .................. H01M 2/1016
429/130
9,083,030 B2 * 7/2015 Park .................... H01M 2/1077
(Continued)

FOREIGN PATENT DOCUMENTS

EP 2562842 A1 2/2013
JP 2004510313 A 4/2004
(Continued)

OTHER PUBLICATIONS

International Search Report and Written Opinion for PCT/IB2015/001867 dated Mar. 3, 2016.

*Primary Examiner* — John D Walters
(74) *Attorney, Agent, or Firm* — Sughrue Mion, PLLC (57) ABSTRACT

An onboard power supply apparatus includes: power storage modules each including power storage devices; a pair of brackets configured to come into contact with respective ends of the power storage modules vertically stacked so as to fix at least an upper power storage module to a vehicle; and an insertion portion that is disposed between at least one of the pair of brackets and an end of one of the power storage modules located between terminal portions of the vertically stacked power storage modules, a connecting member used
(Continued)

for connecting the terminal portions of the vertically stacked power storage modules being inserted in the insertion portion.

4 Claims, 5 Drawing Sheets

(51) Int. Cl.
    *H01M 2/10*     (2006.01)
    *B60K 1/04*     (2006.01)

(52) U.S. Cl.
    CPC ..... *H01M 2/206* (2013.01); *B60K 2001/0405* (2013.01); *H01M 2220/20* (2013.01)

(58) Field of Classification Search
    CPC ... H01M 2/202; H01M 2220/20; B60R 16/04; B60K 1/04; B60K 2001/0405; B60K 2001/0411; B60K 2001/0416; B60K 2001/0438
    USPC ....................................................... 180/68.5
    See application file for complete search history.

(56) References Cited

U.S. PATENT DOCUMENTS

| | | | |
|---|---|---|---|
| 9,481,556 B2 * | 11/2016 | Oishi | H01M 2/1083 |
| 9,608,245 B2 * | 3/2017 | DeKeuster | H01M 2/1077 |
| 2002/0086202 A1 | 7/2002 | Stone et al. | |
| 2012/0270097 A1 | 10/2012 | Yasui et al. | |
| 2016/0099451 A1 * | 4/2016 | Murai | H01M 2/1223 |
| | | | 429/54 |

FOREIGN PATENT DOCUMENTS

| | | |
|---|---|---|
| JP | 2012202066 A | 10/2012 |
| JP | 2014/083600 A1 | 6/2014 |
| JP | 2014127465 A | 7/2014 |
| WO | 2014/109034 A1 | 7/2014 |

* cited by examiner

ONBOARD POWER SUPPLY APPARATUS

CROSS REFERENCE TO RELATED APPLICATIONS

This application is a National Stage of International Application No. PCT/IB2015/001867 filed Oct. 13, 2015, claiming priority based on Japanese Patent Application No. 2014-210903 filed Oct. 15, 2014, the contents of all of which are incorporated herein by reference in their entirety.

BACKGROUND OF THE INVENTION

1. Field of the Invention

The present invention relates to an onboard power supply apparatus in which a plurality of power storage modules each including a plurality of power storage devices are connected to one another.

2. Description of Related Art

International Publication No. WO2014/083600 discloses a battery module in which a plurality of cylindrical batteries are arranged with one longitudinal ends of the cylindrical batteries embedded in a holder.

An onboard power supply apparatus may be configured by connecting a plurality of battery modules described in WO2014/083600, for example, and it is possible to promote effective use of the space in a vehicle if the plurality of battery modules are stacked in the vertical direction. A positive electrode terminal (or negative electrode terminal) of an upper battery module is electrically connected to a negative electrode terminal (or positive electrode terminal) of the lower battery module in series using a bus bar, and in this case, the bus bar is provided in the vertical direction.

Meanwhile, if the battery modules are vertically stacked, and are mounted on a vehicle in this state, vertically stacked battery modules can be fixed to the vehicle with brackets. For example, a pair of brackets are disposed in a manner as to hold the battery modules therebetween from both longitudinal sides of the battery modules. One end of each bracket is fixed to a floor panel or a frame of the vehicle, and the other end thereof is fixed to the longitudinal end of each of the vertically stacked battery modules.

At this time, if the bus bar is vertically disposed at the longitudinal ends of the battery modules, a fixing structure of the vertically stacked battery modules using the bracket (a contact point between the longitudinal ends of the battery modules and the bracket), and a connecting structure between upper and lower battery modules using the bus bar (an electrical connecting path between the battery modules) interfere with each other.

It may be considered to connect the upper and lower battery modules in a manner as to bypass the contact point between the longitudinal ends of the battery modules and the bracket. In this case, the bus bar extending from an electrode terminal of the upper battery module is once led outward of the bracket. The bus bar so located outward of the bracket as to avoid the contact point between the ends and the bracket is then downwardly extended inward of the bracket again so as to be connected to the electrode terminal of the lower battery module. However, in this case, it is required to provide a hole through which the bus bar is inserted between the outer side and the inner side of the bracket. The through-hole formed in the bracket deteriorates strength of the bracket, and thus it is required to reinforce the bracket to improve its strength, and a part of the bus bar is located outward of the bracket, and thus an energizing region of the battery modules is exposed to the outside.

SUMMARY OF THE INVENTION

The present invention provides an onboard power supply apparatus capable of promoting effective use of the space in a vehicle by mounting vertically stacked power storage modules on the vehicle, and also capable of firmly fixing the vertically stacked power storage modules to the vehicle using brackets even if the vertically stacked power storage modules are electrically connected.

An onboard power supply apparatus according to a first aspect of the present invention includes vertically stacked power storage modules each including power storage devices arranged in a plane orthogonal to a predetermined direction in which the power storage devices extend. Each of the power storage modules includes: bus bars electrically connecting the power storage devices; and terminal portions that are connected to the bus bars so as to serve as electrode terminals of the power storage modules, and the terminal portions are disposed at respective ends of each power storage module in a direction in which the plurality of power storage devices are arranged. The onboard power supply apparatus of the present invention further includes: a pair of brackets configured to come into contact with respective ends of the power storage modules vertically stacked so as to fix at least an upper power storage module to a vehicle; and an insertion portion that is disposed between at least one of the pair of brackets and an end of one of the power storage modules located between terminal portions of the vertically stacked power storage modules, a connecting member used for connecting the terminal portions of the vertically stacked power storage modules to each other being inserted in the insertion portion.

According to the above aspect of the present invention, in a fixing structure of providing the terminal portions at the respective ends of the power storage modules, and fixing at least the upper power storage module of the vertically stacked power storage modules to the vehicle with the brackets, an insertion portion is formed between at least one of the pair of brackets and the end of the one power storage module located between the terminal portions of upper and lower power storage modules. Accordingly, it is possible to provide the connecting member used for connecting the terminal portions of the power storage modules vertically stacked without interfering with the contact point between the bracket and the end of the power storage module located between the terminal portions of the vertically stacked power storage modules.

In addition, the insertion portion is disposed between the bracket and the end of the power storage module; and thus the connecting member that is an energizing component of the power storage modules is located inward of the bracket relative to the power storage modules in the insertion portion. Accordingly, it is possible to prevent an energizing region (connecting member) of the power storage modules from being exposed to the outside of the bracket.

The above aspect of the present invention can realize an electrical connecting structure between the upper and lower power storage modules using the connecting member at the ends of the power storage modules, and also realizes a fixing structure of the vertically stacked power storage modules using the brackets. Accordingly, it is possible to mount the vertically stacked power storage modules on the vehicle to promote effective use of the space in the vehicle. In addition, at least the upper power storage module can be fixed to the vehicle without deteriorating strength of the bracket even if the upper and lower power storage modules are electrically connected using the connecting member, and safety for the connecting member can also be secured.

The insertion portion may be a recessed portion disposed at a part of the one of the brackets in a direction apart from the end of the one power storage module located between the terminal portions of the upper and lower power storage modules. The recessed portion may have a rib shape extending in the stacking direction of the power storage modules. It is possible to easily provide the insertion portion simply by recessing the part of the bracket, and the recessed portion defining the insertion portion is formed in a rib shape extending along the stacking direction of the power storage modules; therefore, the insertion portion functions as a reinforcing portion of the bracket, thereby enhancing strength of the bracket.

The one bracket may include: a first fixing portion fixed to the vehicle; and a second fixing portion that comes into contact with the respective ends of the vertically stacked power storage modules, and is provided with the insertion portion. On a side of the end of the power storage module, the second fixing portion may be configured to extend from the first fixing portion up to at least the terminal portion located above the end of the upper power storage module in the stacking direction of the power storage modules. Such a configuration prevents a section from the terminal portion of the lower power storage module to the terminal portion of the upper power storage module from being exposed to the outside of the bracket, thus enhancing safety for the energizing region of the upper and lower power storage modules.

It may be configured to further include a cover that extends from the second fixing portion toward the upper power storage module, and covers above the terminal portion of the upper power storage module. Such a configuration prevents the entire terminal portion of the upper power storage module from being exposed to the outside of the bracket; therefore it is possible to suppress short-circuit due to contamination from above the terminal portion, for example.

Each power storage module may include: a holder including a plurality of apertures into which the respective power storage devices are inserted, the holder holding one ends of the power storage devices; first bus bars including a plurality of first connecting portions formed corresponding to the respective power storage devices arranged in the plane so that the first connecting portions are connected to first end portions serving as one electrodes of the power storage devices at one ends of the power storage devices that are disposed in the holder; and second bus bars including a plurality of second connecting portions formed corresponding to the respective power storage devices arranged in the plane so that the second connecting portions are connected to second end portions serving as the other electrodes of the power storage devices at the other ends of the power storage devices. At this time, the terminal portions include: a first terminal portion that is connected to the first bus bars, and is disposed at one end of the power storage module in a direction in which the plurality of power storage devices are arranged; and a second terminal portion that is connected to the second bus bars, and is disposed at the other end of the power storage module in the direction in which the plurality of power storage devices are arranged. The one bracket may be coupled to the end of the holder in the direction in which the plurality of power storage devices are arranged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention will be described hereinafter.

Embodiment 1

An onboard power supply apparatus that is Embodiment 1 of the present invention will be described. The onboard power supply apparatus 1 of the present embodiment is mounted on a vehicle, such as a hybrid vehicle and an electric vehicle, for example, and is used as a power supply apparatus for supplying electric power to a drive motor.

The onboard power supply apparatus 1 of the present embodiment may be mounted in a luggage space located rearward of rear seats, and may be fixed to a floor panel FP of the vehicle, for example. Other than the luggage space, in a vehicle interior as a space for accommodating occupants, the onboard power supply apparatus 1 may be disposed under a driver's seat or a passenger's seat, or under the rear seats.

Figure 1:
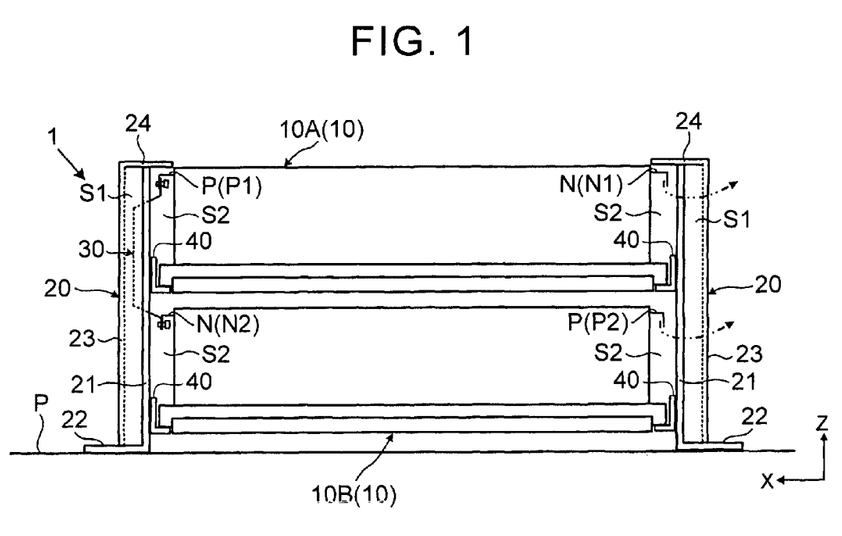
FIG. 1 is a side view of an onboard power supply apparatus in Embodiment 1 of the present invention.

FIG. 1 is a side view of the onboard power supply apparatus 1 of the present embodiment. The onboard power supply apparatus 1 includes a plurality of battery modules 10. In the present embodiment, for the purpose of promoting effective use of the space in the vehicle, two battery modules (equivalent to power storage modules) 10A, 10B are vertically stacked. An X-axis, a Y-axis, and a Z-axis orthogonally intersect one another. In the present embodiment, an axis corresponding to a vertical direction is defined as the Z axis. The relation of the X axis, the Y axis, and the Z axis is the same as that in the other drawings.

The battery modules 10A, 10B vertically disposed in the Z direction are fixed to a floor panel FP through L-shaped brackets 20. The battery modules 10A, 10B extend in the X direction, and a pair of brackets 20 are respectively disposed to both X-directional ends (longitudinal ends) of the battery modules 10A, 10B.

The brackets 20 are so disposed as to hold the battery modules 10A, 10B therebetween on the both X-directional ends of the battery modules 10A, 10B. Each bracket 20 includes a fixing portion 21 (equivalent to a second fixing portion) extending in the Z direction, and a fixing portion 22 (equivalent to a first fixing portion) extending from a bottom end of the fixing portion 21 in the X direction. The X-directional ends of the battery modules 10A, 10B respectively extend in the Z direction, and are aligned at the same position in the X direction. The respective X-directional ends of the battery modules 10A, 10B come into contact with the fixing portions 21 perpendicularly extending from the fixing portions 22, and the X-directional ends of the battery modules 10A, 10B are fixed to the fixing portions 21, and the fixing portions 22 are fixed to the floor panel FP.

The battery modules 10A, 10B and the brackets 20 and the brackets 20 and the floor panel FP may be fixed by welding or fastening using fastening members such as bolts, for example.

The battery modules 10A, 10B may also be fixed (coupled) to the fixing portions 21 of the brackets 20 via intermediate members 40 as shown in FIG. 1. In this case, each intermediate member 40 is configured to be an end of each of the battery modules 10A, 10B (or end of the holder 12 described later). Not through the intermediate members 40, the respective X-directional ends of the battery modules 10A, 10B may be fixed (coupled) to the corresponding fixing portions 21. Each intermediate member 40 may be formed of a metal material or a resin material.

The battery modules 10A, 10B of the present embodiment are electrically connected in series. Hence, a connecting member 30 is provided to connect a positive electrode terminal P1 of the upper battery module 10A and a negative electrode terminal N2 of the lower battery module 10B. The connecting member 30 vertically extends in the Z direction in which the positive electrode terminal P1 and the negative electrode terminal N2 are aligned. If the onboard power supply apparatus 1 of the present embodiment includes two upper and lower battery modules 10A, 10B, a negative electrode terminal N1 of the upper battery module 10A becomes a negative electrode terminal of the onboard power supply apparatus 1, and a positive electrode terminal P2 of the lower battery module 10B becomes a positive electrode terminal of the onboard power supply apparatus 1.

Each bracket 20 includes an insertion portion 23 that defines an insertion space S1 between the fixing portion 21 and the X-directional end of the battery module 10A located between the positive electrode terminal P1 and the negative electrode terminal N2 arranged in the Z direction. As shown in FIG. 1, the insertion portion 23 perpendicularly extends from the fixing portion 22, and a part of the connecting member 30 used for connecting the positive electrode terminal P1 and the negative electrode terminal N2 arranged in the Z direction is placed in the insertion portion 23.

Figure 2:
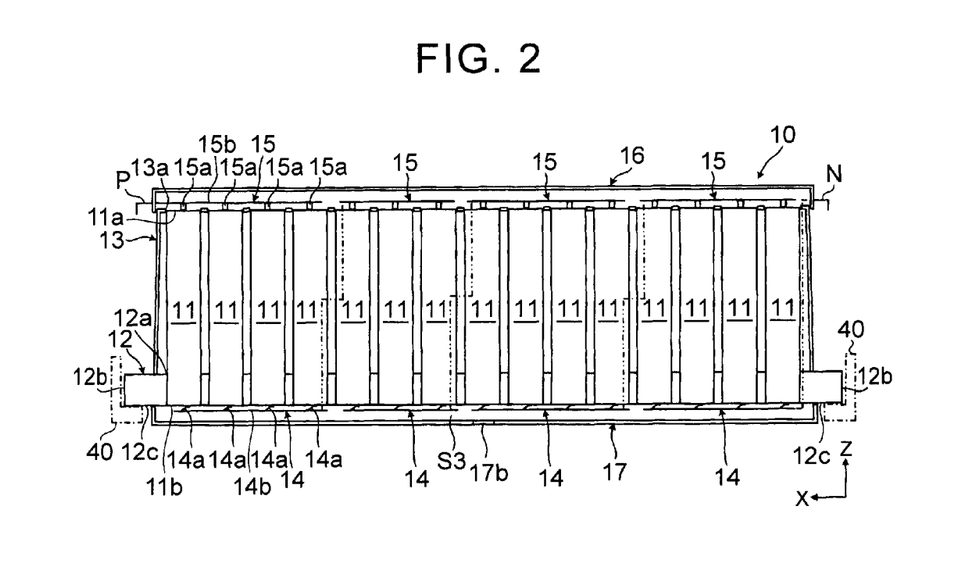
FIG. 2 is a sectional view of a battery module in Embodiment 1 of the present invention.

With reference to FIG. 2, the battery module 10 of the present embodiment will be described. Each of the vertically stacked battery modules 10A, 10B is identical to the battery module 10 as shown in FIG. 2. The battery module 10 includes plural battery cells (equivalent to power storage devices) 11. Each battery cell 11 is a common cylindrical battery cell, and a power generating element is contained in a battery case formed in a cylindrical shape. As the battery cell 11, a secondary battery, such as a nickel-metal hydride battery and a lithium-ion battery, may be used. Instead of a secondary battery, an electric double layer capacitor may be used.

As shown in FIG. 2, each battery cell 11 extends in the Z direction, and both ends in the longitudinal direction (Z direction) of the battery cell 11 are provided with a positive electrode terminal 11a and a negative electrode terminal 11b, respectively. The battery case that is a sheath of the battery cell 11 may be formed of a case body and a cover, and the power generating element is contained in the case body formed in a cylindrical shape, and the case body is covered with the cover, thereby configuring the battery cell 11.

The gasket formed of an insulating material is disposed between the cover and the case body. A positive plate of the power generating element is electrically connected to the cover, and is used as the positive electrode terminal 11a of the battery cell 11. A negative plate of the power generating element is electrically connected to the case body, and is used as the negative electrode terminal 11b of the battery cell 11. In the present embodiment, an end surface of the case body located opposite to the cover (positive electrode terminal 11a) in the Z direction is used as the negative electrode terminal 11b; thus the positive electrode terminal 11a and the negative electrode terminal 11b are respectively located at the both Z-directional ends of the battery cell 11.

All the battery cells 11 included in the battery module 10 (10A, 10B) are arranged such that the positive electrode terminals 11a are upwardly placed as shown in FIG. 2. The positive electrode terminals 11a of all the battery cells 11 are arranged in an identical plane (X-Y plane). The negative electrode terminals 11b are arranged in the same manner as the positive electrode terminals 11a.

The respective battery cells 11 are held by a holder 12 as a holding member. The holder 12 has plural apertures 12a in each of which the battery cell 11 is inserted. Each aperture 12a has a shape following an outer circumferential surface of the battery cell 11 (specifically, a circular shape), and the apertures 12a are formed in the same number as that of the battery cells 11. The holder 12 may be formed of a metallic material excellent in thermal conductivity, such as aluminum, or a resin material excellent in thermal conductivity. An insulator formed of an insulating material, such as resin, may be disposed between the apertures 12a of the holder 12 and the battery cells 11.

A module case 13 is formed in a shape surrounding the plural battery cells 11 held by the holder 12 in the X-Y plane, and the plural battery cells 11 are housed inside the module case 13. The module case 13 may be formed of an insulating material, such as resin, and the plural apertures 13a are formed on a top surface of the module case 13 where the positive electrode terminals 11a of the battery cells 11 are located. The ends of the battery cells 11 provided with the positive electrode terminals 11a are inserted in the respective apertures 13a.

In each side surface in the X direction of the module case 13, plural slits (not shown) may be formed as ventilating ports. The slits may be formed at predetermined intervals in each side surface of the module case 13. For example, cooling air is supplied from the slits in one side surface. The cooling air is caused to flow through the battery module 10 in the Y direction, and flow out from the slits in the other side surface to the outside of the battery module 10, thereby cooling the battery cells 11.

A region where the negative electrode terminals 11*b* of the battery cells 11 are located is positioned in the X-Y plane by the apertures 12*a* of the holder 12, and a region where the positive electrode terminals 11*a* of the battery cells 11 are located is positioned in the X-Y plane by the apertures 13*a* of the module case 13. The both longitudinal (Z-directional) ends of the battery cells 11 are respectively positioned by the holder 12 and the module case 13 so as to prevent every two adjacent battery cells 11 in the X-Y plane from coming into contact with each other.

As shown in FIG. 2, in each battery module 10 of the present embodiment, the holder 12 is used as a base member, and the respective ends of the battery cells 11 where the negative electrode terminals 11*b* are located are inserted in the corresponding apertures 12*a* in such a manner that the respective battery cells 11 upwardly stand from the holder 12. Bus bars 14 (equivalent to first bus bars) are disposed to the corresponding negative electrode terminals 11*b* of the battery cells 11 that are exposed from the apertures 12*a* of the holder 12. The negative electrode terminals 11*b* are respectively connected to corresponding connecting portions 14*a* (equivalent to first connecting portions) of the bus bars 14. Bus bars 15 (equivalent to second bus bars) are disposed to the corresponding positive electrode terminals 11*a* of the battery cells 11 upwardly exposed from the apertures 13*a* of the module case 13. The positive electrode terminals 11*a* are respectively connected to corresponding connecting portions 15*a* (equivalent to second connecting portions) of the bus bar 15. FIG. 2 is a sectional view taken along line A-A of FIG. 3.

As shown in FIG. 2, the connecting portions 14*a* are disposed at corresponding positions facing the negative electrode terminals 11*b* in the Z direction. The negative electrode terminal 11*b* and the connecting portions 14*a* may be connected by welding or the like. All the bus bars 14 as the negative bus bars are negatively charged by the plural battery cells 11.

Each bus bar 14 is formed of a conductive material, such as metal. The bus bar 14 includes the plural connecting portions 14*a* connected to the corresponding negative electrode terminals 11*b* of the battery cells 11. The connecting portions 14*a* are formed in the same number as that of the battery cells 11 (negative electrode terminals 11*b*) in the X-Y plane.

Each bus bar 14 of the present embodiment may be formed by press-punching a flat planar member whose thickness (plate thickness) extends in the Z direction. The plural connecting portions 14*a* are formed with predetermined intervals at respective positions corresponding to arrangement positions of the battery cells 11 (negative electrode terminals 11*b*). Each bus bar 14 is disposed with a predetermined distance from the plural battery cells 11 (negative electrode terminals 11*b*) in the Z direction, and the connecting portions 14*a* projecting from a planar member (base end 14*b*) in the Z direction are connected to the corresponding negative electrode terminals 11*b* of the battery cells 11 by welding.

The connecting portions 15*a* of each bus bar 15 of the present embodiment are disposed at corresponding positions facing the positive electrode terminals 11*a* in the Z direction. The positive electrode terminal 11*a* and the connecting portions 15*a* may be connected via welding or the like. All the bus bars 15 that are positive bus bars are positively charged by the plural battery cells 11.

As similar to the bus bar 14, each bus bar 15 may be formed by press-punching a flat planar member. Each of the connecting portions 15*a* is formed in a shape projecting from the planar member (base end 15*b*) toward the corresponding positive electrode terminal 11*a* of the battery cells 11, and the plural connecting portions 15*a* are formed with predetermined intervals in the same number as that of the battery cells 11 (positive electrode terminal 11*a*) in the X-Y plane.

Each bus bar 15 is disposed with a predetermined distance from the plural battery cells 11 (positive electrode terminals 11*a*) in the Z direction, and the connecting portions 15*a* projecting from the planar member in the Z direction are connected to the corresponding positive electrode terminals 11*a* of the battery cells 11.

The connecting portions 15*a* of the present embodiment serve as connecting portions electrically connected to the positive electrode terminals 11*a* of the battery cells 11, and are also used as a fuse to be fused to interrupt the electrical connection to the battery cells 11 (positive electrode terminals 11*a*) if currents of a predetermined value or more flow. For example, each of the connecting portions 15*a* may be formed to have a smaller width than that of each of the connecting portions 14*a* of the bus bars 14 so as to have a smaller upper limit current value relative to pre-arcing time-current characteristics.

In the plural battery cells 11 of the present embodiment, the positive electrode terminals 11*a* (or negative electrode terminals 11*b*) of the battery cells 11 are so arranged as to have the same orientation in the Z direction. Each single bus bar 14 is connected to plural negative electrode terminals 11*b*, and each single bus bar 15 is connected to plural positive electrode terminals 11*a* of the battery cells 11, thereby electrically connecting the plural battery cells 11 in parallel. The other regions than the connecting portions of the bus bars 14, 15 may be covered with an insulation film or the like.

In addition, as shown in FIG. 2, the battery module 10 is configured such that a predetermined number of battery cells 11 are connected with the bus bar 14 and the bus bar 15 in parallel so as to form a single battery block, and a plurality of battery blocks are connected in series. The respective battery blocks can be connected in series by connecting a lead of the bus bar 14 of one battery block to a lead of the bus bar 15 of another battery block adjacently located in the X direction. In an example of FIG. 2, two-dot chain lines schematically show an aspect of electrically connecting every two adjacent battery blocks to each other in series via the leads. Each battery module may be configured by using battery blocks whose battery cells 11 are all connected in parallel.

Each terminal end of the plural battery blocks connected in series is used as an electrode terminal (equivalent to a terminal portion) of the battery module 10. In the example of FIG. 2, a part of the bus bar 15 of the battery block located at one X-directional end is extended to pick up a positive electrode terminal P of each battery module. A part of the bus bar 14 of the battery block located at the other X-directional end is extended to pick up a negative electrode terminal N of each battery module. The positive electrode terminal P may be a different electrode terminal connected to the bus bar 15 without extending the part of the bus bar 15. The negative terminal N may be configured in the same manner as that of the positive electrode terminal P.

The positive electrode terminal P and the negative electrode terminal N of each battery module 10 are respectively disposed at the both X directional ends of the battery module 10, and outwardly project from the module case 13 in the X-direction, respectively. In this case, the holder 12 is extendingly disposed more outward than the module case 13 in the X direction. As shown in FIG. 1, in a state in which each X-directional end of each battery module 10 is coupled to the fixing portion 21 of each bracket 20, a space S2 is formed between each fixing portion 21 and the module case 13. The positive electrode terminal P and the negative electrode terminal N of each battery module 10 are disposed in the corresponding spaces S2 formed above the holder 12 outwardly projecting from the module case 13.

A cover member 16 for covering the bus bars 15 from above is provided on a top surface of each battery module 10. The cover member 16 extends in the X-Y plane, and is formed in a shape covering the entire top surface of the module case 13 where the positive electrode terminals 11a (equivalent to second end portions) of the battery cells 11 are exposed. The cover member 16 may be fixed to the module case 13, for example, and may be formed of resin or the like, as similar to the module case 13.

On the other hand, a cover member 17 for covering the bus bars 14 is provided on a bottom surface of the battery module 10. The cover member 17 also extends in the X-Y plane, and is formed in a shape covering the entire bottom surface of the holder 12 where the negative electrode terminals 11b of the battery cells 11 are exposed. The cover member 17 is a metallic member that covers the negative electrode terminals 11b (equivalent to first end portions) of the battery cells 11 arranged in the X-Y plane, and is used for forming a gas exhaust space S3. The cover member 17 may include locking portions (not-shown) to be locked to the holder 12, for example.

In each battery cell 11 of the present embodiment, there may be provided an exhaust valve (not shown) for exhausting gas generated inside the battery cell 11 to the outside. The exhaust valve may be formed at a bottom of the case body serving as the negative electrode terminal 11b. The exhaust valve may be a ruptured valve, for example, and may be configured by a groove formed at the bottom of the case body serving as the negative electrode terminal 11b. To cope with increased inner pressure of the battery cells 11 due to generated gas, the gas inside the case body can be exhausted to the outside of the battery cell 11 through rupture of the bottom of the case body initiated by the groove.

In the bottom surface of the battery module 10, the vicinity of the region where the bus bars 14 are disposed is covered with the cover member 17, so that there is formed an exhaust space S3 sealed with a bottom surface of the holder 12 and the cover member 17. The cover member 17 may be provided with an exhaust port 17b of the exhaust space S3. Gas exhausted from the inside of the battery cells 11 through the exhaust valve flows into the exhaust space S3 between the holder 12 and the cover member 17, and is exhausted from the exhaust port 17b to the outside of the battery module 10. An exhaust hose communicated with the outside of the vehicle or the like may be connected to the exhaust port 17b.

In an example of FIG. 2, each X-directional end of the holder 12 is provided with the respective L-shaped intermediate member 40 that covers an end surface 12b and a bottom surface 12c located in a region extended more outward than the module case 13 in the X direction. Each intermediate member 40 indicated by a long dashed short dashed line is configured such that the bottom surface 12c of the holder 12 is placed on the intermediate member 40, and the intermediate member 40 is disposed more outward than the end surface 12b in the X direction, and is provided with a contact surface 41 to come into contact with each bracket 20 (the inner surface 21b of the fixing portion 21).

Figure 3:
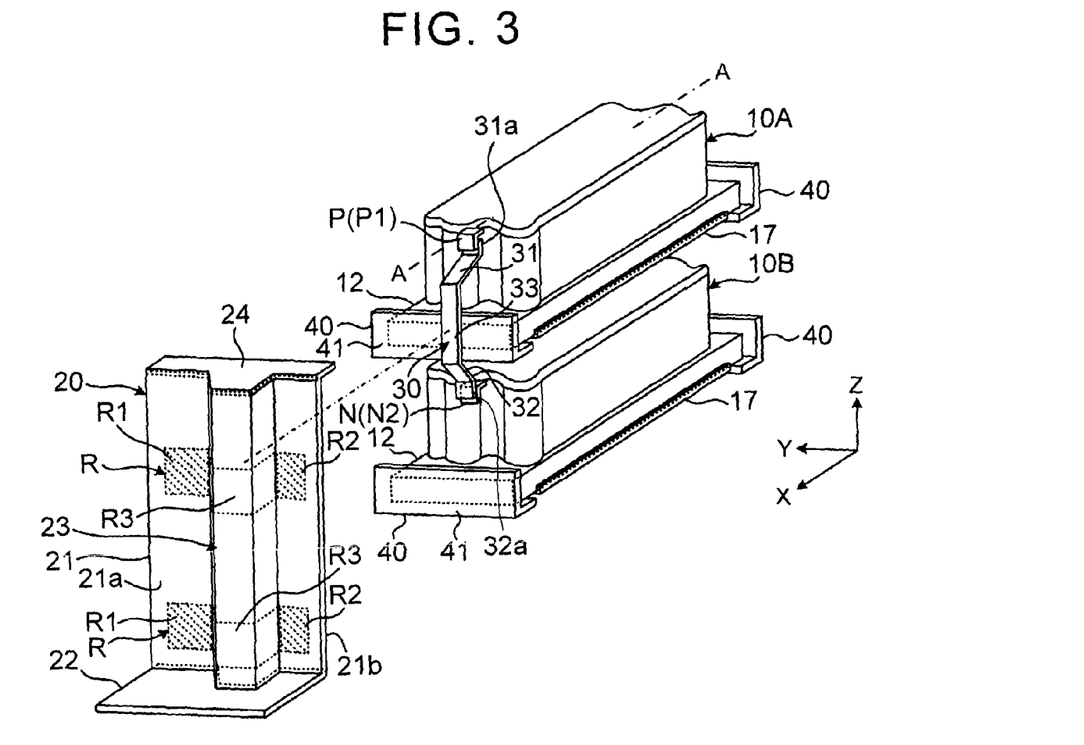
FIG. 3 is a configurational perspective view explaining a fixing structure of battery modules stacked in upper and lower stages and a connecting structure of connection between electrode terminals using a connecting member in Embodiment 1 of the present invention, and showing the battery modules in the upper and lower stages, a bracket, and the connecting member.
Figure 4:
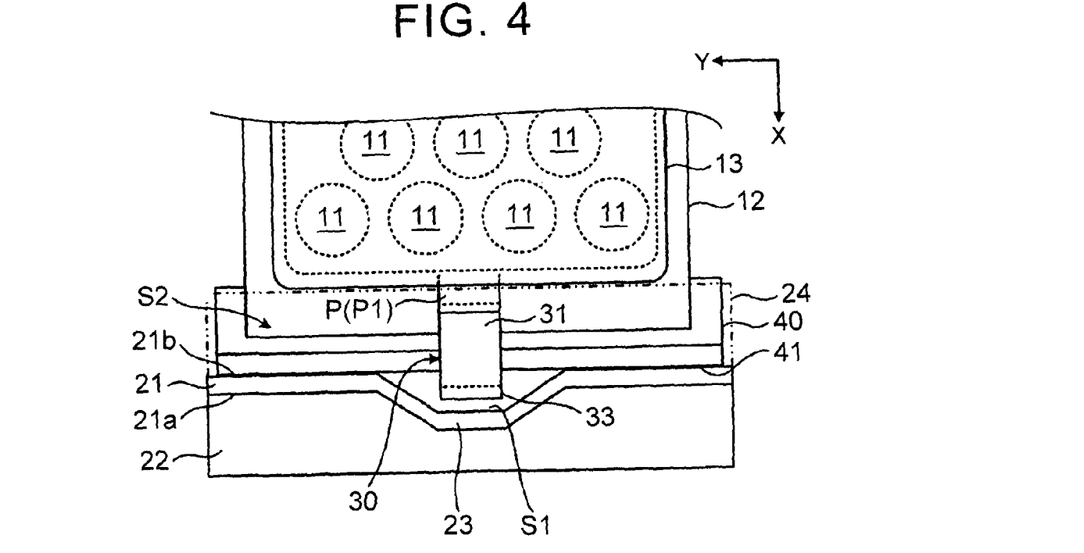
FIG. 4 is a partial top view showing the fixing structure between the bracket and the battery module in the upper stage in Embodiment 1 of the present invention.

FIG. 3 is a drawing for explaining the fixing structure of the battery modules 10A, 10B stacked in the upper and lower stages, and the connecting structure of the electrode terminals with the connecting member 30, and is also a configurational perspective view showing the battery modules 10A, 10B in the upper and lower stages, the bracket 20, and the connecting member 30. FIG. 4 is a partial top view of the fixing structure of each bracket 20 and the upper battery module 10A. Examples of FIG. 3 and FIG. 4 show the fixing structure of one X-directional end of the battery modules 10A, 10B stacked in the upper and lower stages, and the fixing structure of the other X-directional end thereof is the same as shown in FIG. 1; therefore, description thereof will be omitted.

As shown in FIG. 3, two battery modules 10A, 10B stacked in the upper and lower stages are configured as a single module unit. The respective contact surfaces 41 of the intermediate members 40 serving as the respective X-directional ends of the battery modules 10A, 10B are located at the same position in the X direction, and are also aligned in the Z direction.

At this time, the battery modules 10A, 10B are arranged in such a manner that the positive electrode terminal P1 of the upper battery module 10A and the negative electrode terminal N2 of the lower battery module 10B are located on the identical X-directional end side. For example, in the example of FIG. 2, the upper battery module 10A is placed such that the positive electrode terminal P1 is located on the left side in the X direction, and the lower battery module 10B is placed in the opposite direction in the X direction to the upper battery module 10A so that the negative electrode terminal N2 of the lower battery module 10B is located on the left side in the X direction. Hence, at the identical X-directional end, the positive electrode terminal P1 and the negative electrode terminal N2 are aligned in the Z direction.

The positive electrode terminal P1 and the negative electrode terminal N2 are connected with the connecting member 30 extending in the Z direction. The connecting member 30 includes: a first connecting portion 31 having a connecting end 31a connected to the positive electrode terminal P1; a second connecting portion 32 having a connecting end 32a connected to the negative electrode terminal N2; and a third connecting portion 33 connecting the first connecting portion 31 and the second connecting portion 32. The connecting member 30 is a bus bar formed of a conductive material such as metal, as similar to the bus bars 14, 15.

The first connecting portion 31 extends obliquely downward from the connecting end 31a toward the contact surface 41 located more outward than the connecting end 31a. The third connecting portion 33 extends downward in the Z direction, and is located more outward than the contact surface 41. Below the contact surface 41, the second connecting portion 32 extends from the third connecting portion 33 located more outward than the contact surface 41 toward the negative electrode terminal N2. The connection between the positive electrode terminal P1 and the connecting end 31a as well as the connection between the negative electrode terminal N2 and the connecting end 32a may be carried out by welding or fastening using fastening members such as bolts.

As shown in FIG. 3, the respective contact surfaces 41 serving as the respective ends of the upper and lower battery modules 10A, 10B come into contact with the inner surface 21b of the fixing portion 21 so as to be fixed to the bracket 20. As shown in FIG. 3, the inner surface 21b is fixed to the battery modules 10A, 10B in a region R with which the respective contact surfaces 41 of the battery modules 10A, 10B come into contact.

At this time, the bracket 20 is provided with an insertion portion 23 in a recessed shape formed by recessing the inner surface 21b of the fixing portion 21 in a direction apart from the contact surface 41 of the upper battery module 10A (outward in the X direction) (see FIG. 4). The insertion portion 23 extends more outward than regions R1 and regions R2 of the region R that come into contact with the respective contact surfaces 41. Regions R3 of the region R located apart from the respective contact surfaces 41 define the insertion space S1 between the inner surface 21b of the fixing portion 21 and the respective contact surfaces 41. The insertion portion 23 is a recessed portion formed in the fixing portion 21 in a manner as to be in a rib shape extending in the Z direction up to a top end of the fixing portion 21. The insertion space S1 also extends from the fixing portion 22 up to the top end of the fixing portion 21.

This configuration is the same for the lower battery module 10B. In the region R located below the region R corresponding to the upper battery module 10A, the contact surface 41 of the lower battery module 10B comes into contact with the region R1 and the region R2 so as to be fixed to the bracket 20.

The fixing portion 21 is so formed as to extend in the Z direction from the fixing portion 22 fixed to the floor panel FP to at least the positive electrode terminal P1 located more upward than the contact surface 41 of the upper battery module 10A.

On the top end of the fixing portion 21 upwardly extending in the Z direction, there is provided a cover 24 inwardly extending in the X direction from the fixing portion 21 toward the upper battery module 10A so as to cover above the positive electrode terminal P1 of the upper battery module 10A. As shown in FIG. 4, the cover 24 indicated by a two-dot chain line covers above the space S2 formed between the inner surface 21b of the fixing portion 21 and the X-directional end surface of the module case 13. In the example of FIG. 3, the cover 24 has the same width as a Y-directional width of the fixing portion 21, but may be configured to have a width at least covering above the positive electrode terminal P1.

The onboard power supply apparatus 1 of the present embodiment has the fixing structure of the module batteries in which the electrode terminals are provided at the respective ends of the battery modules 10A, 10B, and the battery modules 10A, 10B stacked in the upper and lower stages are fixed to the vehicle with the pair of brackets 20. The insertion portion 23 is provided between the bracket 20 and the end of the upper battery module 10A located between the electrode terminals of the upper and lower battery modules 10A, 10B. Hence, the connecting member 30 that connects the electrode terminals of the vertically stacked battery modules 10A, 10B can be disposed without interfering with the contact point between the end of the upper battery module 10A and the bracket 20.

Because the insertion portion 23 is disposed between the bracket 20 and the respective ends of the battery modules 10A, 10B, the connecting member 30 that is an energizing component of the onboard power supply apparatus 1 is located inward of the bracket 20 relative to the battery modules 10A, 10B in the insertion portion 23. Accordingly, it is possible to prevent the energizing region (connecting member 30) of the onboard power supply apparatus 1 from being exposed to the outside (to the outer surface 21a) of the bracket 20.

The onboard power supply apparatus 1 can realize the electrical connecting structure between the upper and lower battery modules 10A, 10B using the connecting member 30 at the ends of the battery modules 10A, 10B, and also realizes the fixing structure of the vertically stacked battery modules 10A, 10B using the brackets 20. Accordingly, it is possible to mount the vertically stacked battery modules 10 on the vehicle to promote effective use of the space in the vehicle. In addition, the battery modules 10A, 10B can be fixed to the vehicle without deteriorating strength of the bracket 20 even if the upper and lower battery modules 10A, 10B are electrically connected in series using the connecting member 30, and the connecting member 30 is prevented from being exposed to the outside by the bracket 20 (insertion portion 23); therefore, it is possible to secure safety for the energizing region (high voltage region).

The insertion portion 23 is formed to be a recessed portion by recessing a part of the bracket 20 in a direction apart from the end of the battery module 10A; therefore, it is possible to easily provide the insertion portion 23 simply by recessing the part of the bracket 20 (fixing portion 21) along the Z direction. In addition, the recess-shaped insertion portion 23 is formed in a rib shape extending along the Z direction; therefore, the insertion portion 23 functions as a reinforcing portion of the bracket 20, thereby enhancing strength of the bracket 20.

The fixing portion 21 extends in the Z direction from the fixing portion 22 fixed to the floor panel FP up to at least the positive electrode terminal P1 located above the contact surface 41 of the upper battery module 10A, and thus a section from the electrode terminal of the lower battery module 10B to the electrode terminal of the upper battery module 10A is not exposed to the outside of the bracket 20. Accordingly, it is possible to enhance safety for the energizing region of the onboard power supply apparatus 1.

In addition, the bracket 20 further includes the cover 24 that covers above the electrode terminal of the upper battery module 10A, and thus the entire electrode terminal of the upper battery module 10A is prevented from being exposed to the outside of the bracket 20; therefore, it is possible to enhance safety for the energizing region of the onboard power supply apparatus 1 as well as suppressing short-circuit due to contamination from above the electrode terminal.

Figure 5:
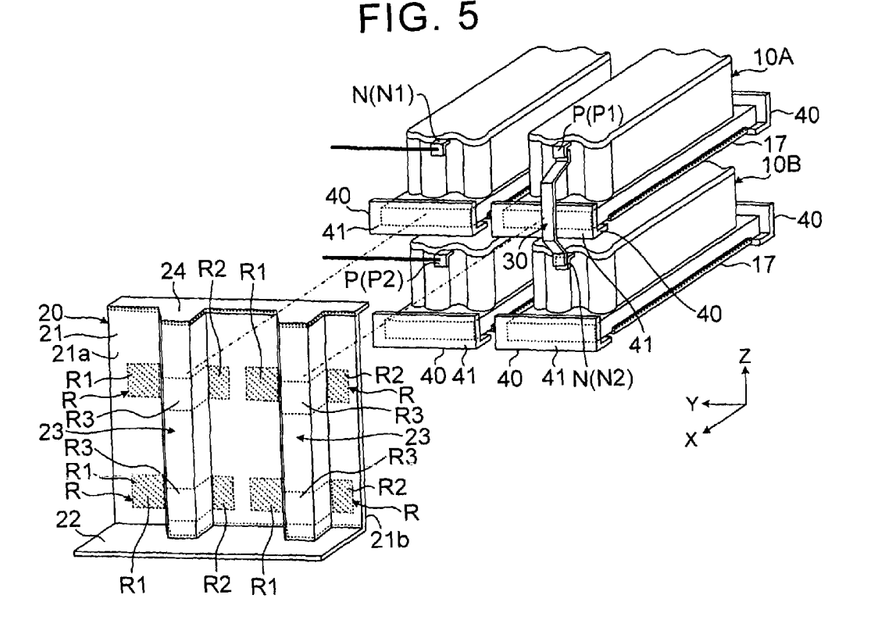
FIG. 5 is a drawing showing a first variation of the present invention, and showing a fixing structure in which plural module units, each formed of the battery modules stacked in the upper and lower stages, are arranged.
Figure 6:
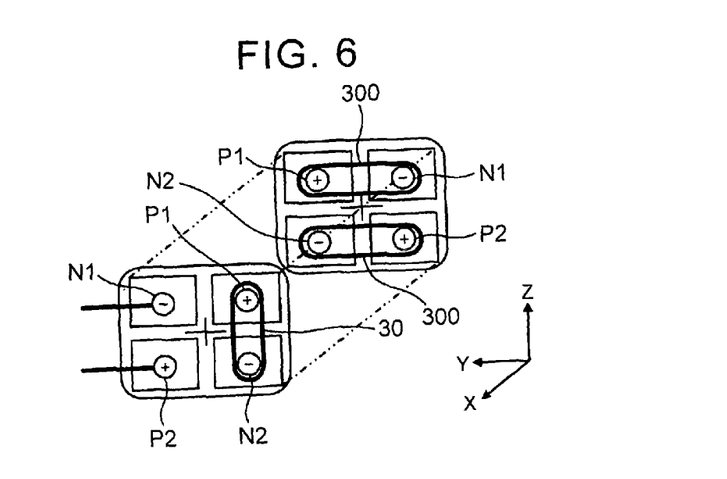
FIG. 6 is a schematic drawing explaining an aspect of serially connecting the battery modules of each module unit in FIG. 5.
Figure 7:
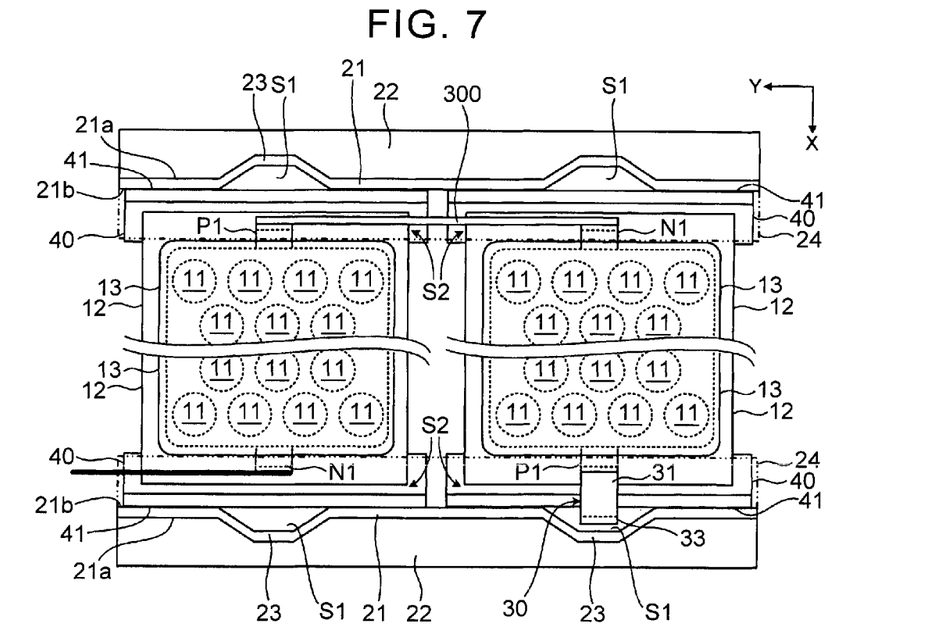
FIG. 7 is a drawing explaining a fixing structure between the brackets and the battery module in the upper stage, and an aspect of serially connecting the battery modules in FIG. 5.

With reference to FIG. 5 to FIG. 7, a first variation of the onboard power supply apparatus 1 according to the present embodiment will be described hereinafter. As shown in FIG. 5, the first variation includes a fixing structure in which two module units each including the aforementioned battery modules 10A, 10B stacked in the upper and lower stages are arranged in the Y direction.

For example, two module units each including the battery modules 10A, 10B stacked in the upper and lower stages may be arranged in the Y direction, thus configuring a battery unit including four battery modules 10 in total.

Each bracket 20 of the first variation includes the fixing portion 21 having the same width as or a greater width than a total width of the X-directional ends of the two module units. The fixing portion 21 is provided with two insertion portions 23 corresponding to the two module units arranged in the Y direction. In the right module unit, the right insertion portion 23 is disposed in correspondence to a position where the electrode terminal of the upper battery module 10A and the electrode terminal of the lower battery module 10B are aligned in the Z direction. Similarly, in the left module unit, the left insertion portion 23 is disposed in correspondence to a position where the respective electrode terminals of the upper and lower battery modules 10A, 10B are aligned in the Z direction.

FIG. 6 is a schematic drawing explaining a connecting aspect of electrically connecting the four battery modules as shown in FIG. 5 in series. As shown in FIG. 6, in the right module unit, a positional relation between the positive electrode terminals P and the negative electrode terminals N of the battery modules 10A, 10B is as shown in FIG. 1. To the contrary, in the left module unit, a positional relation of the positive electrode terminals P and the negative electrode terminals N of the battery modules 10A, 10B is inverse of that of the right module unit in the X direction.

The left module unit is configured such that the positive electrode terminal P2 of the lower battery module 10B is a positive electrode terminal of the onboard power supply apparatus 1, and the negative electrode terminal N1 of the upper battery module 10A is a negative electrode terminal of the onboard power supply apparatus 1. In an example of FIG. 5, connecting lines indicated by bold solid lines used for connection to a load (e.g., motor generator) are respectively connected to the positive electrode terminal P2 of the lower battery module 10B and to the negative electrode terminal N1 of the upper battery module 10A.

In this case, at one X-directional end (backward in the X direction of FIG. 6), the positive electrode terminal P1 of the upper battery module 10A in the left module unit and the negative electrode terminal N1 of the upper battery module 10A in the right module unit are connected with a connecting member 300. The negative electrode terminal N2 of the lower battery module 10B in the left module unit and the positive electrode terminal P2 of the lower battery module 10B in the right module unit are connected with the connecting member 300. At the other X-directional end (frontward in the X direction of FIG. 6), in the right module unit, the positive electrode terminal P1 of the upper battery module 10A and the negative electrode terminal N2 of the lower battery module 10B are connected with the connecting member 300. Each connecting member 300 is the same energizing component as the connecting member 30.

FIG. 7 is a drawing explaining the fixing structure and the serial connecting structure among the battery modules of the first variation. As shown in FIG. 7, the positive electrode terminal P1 of the upper battery module 10A in the left module unit and the negative electrode terminal N1 of the upper battery module 10A in the right module unit are arranged side by side in the Y direction. In this case, as aforementioned, the space S2 is formed between each fixing portion 21 and the module case 13, and each space S2 opens in the Y direction.

Hence, the spaces S2 are communicated with each other in the Y direction between two adjacent module units, and the connecting member 300 may be disposed in substantially parallel with the fixing portion 21 of each bracket 20 in the Y direction through the respective spaces S2. Similarly, the negative electrode terminal N1 of the lower battery module 10B in the left module unit and the positive electrode terminal P2 of the lower battery module 10B in the right module unit may be connected with the connecting member 300 in the same manner.

Since each space S2 opens in the Y direction, the connecting line connected to the load can be connected to the positive electrode terminal P2 of the lower battery module 10B that is the positive electrode terminal of the onboard power supply apparatus 1 from a Y-directional side surface of a corresponding space S2. This configuration is the same for the negative electrode terminal N1 of the upper battery module 10A that is the negative electrode terminal of the onboard power supply apparatus 1.

Figure 8:
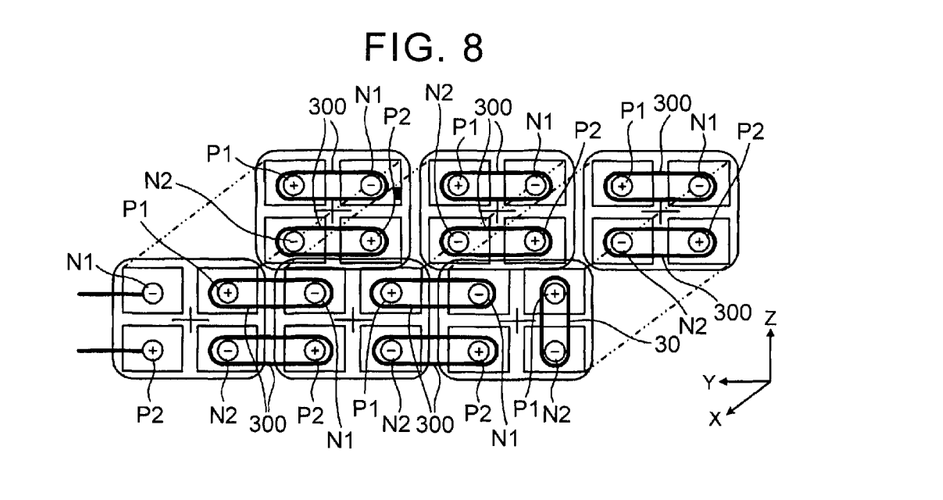
FIG. 8 is a schematic drawing showing a second variation of the present invention, and explaining an aspect of serially connecting the respective battery modules included in plural module units.

FIG. 8 is a drawing showing a second variation of the onboard power supply apparatus 1 according to the present embodiment. The variation as shown in FIG. 8 provides an aspect of configuring the onboard power supply apparatus 1 by further arranging plural battery units each including the four battery modules 10 as shown in the above first variation.

As shown in FIG. 8, three battery units are electrically connected via the connecting members 300, and all the battery modules 10 included in the three battery units are connected in series. Each of the three battery units is provided with the pair of brackets 20 compatible with two module units arranged side by side in the Y direction as shown in the first variation, and the battery units are respectively fixed to the vehicle through the brackets 20.

As shown in an example of FIG. 8, if all the battery modules 10 included in the three battery units are connected in series, it is required in one module unit to connect the upper battery module 10A and the lower battery module 10B in the vertical direction; and in such a case, it is possible to electrically connect the upper and lower battery modules 10A, 10B by disposing the connecting member 30 in the vertical direction through the insertion portion 23 provided to the bracket 20.

Figure 9:
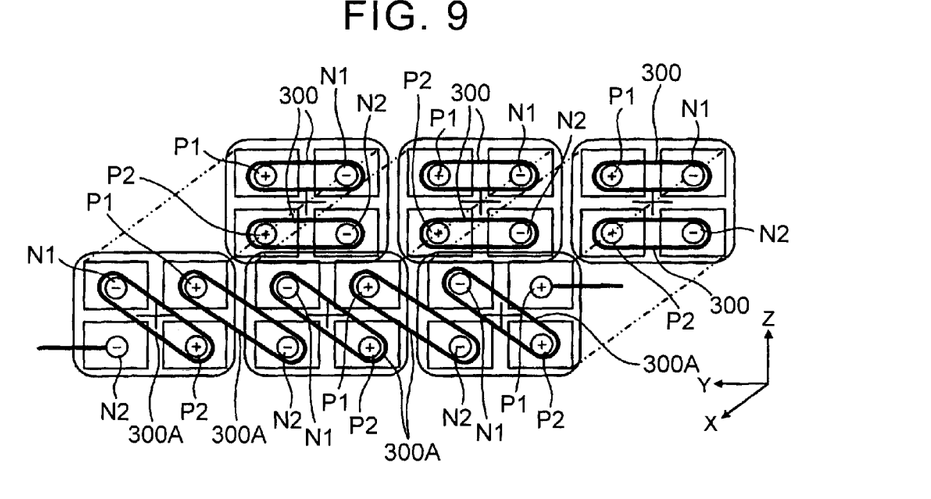
FIG. 9 is a schematic drawing showing a third variation of the present invention, and explaining an aspect of serially connecting the respective battery modules included in plural module units.

FIG. 9 is a drawing showing a third variation of the onboard power supply apparatus 1 according to the present embodiment. The variation as shown in FIG. 9 is different from the above second variation in the connecting aspect of electrically connecting every two adjacent module units and every adjacent battery units in the Y direction.

As shown in FIG. 9, the positional relation of the positive electrode terminals P and the negative electrode terminals N of the upper and lower battery modules 10A, 10B in two module units included in each battery unit is the same in the X direction. In addition, the positional relation of the positive electrode terminal P and the negative electrode terminal N of the upper and lower battery modules 10A, 10B in one module unit is inverse of those in the other module unit in the X direction.

In each battery unit, at one X-directional end (backward in the X direction in FIG. 9), two adjacent battery modules in different module units in the Y direction are connected to each other via the connecting members 300. At the other X-directional end (frontward in the X direction in FIG. 9), an upper battery module 10A in one module unit and a lower battery module 10B in the other module unit are connected to each other via a connecting member 300A. In addition, at the other X-directional end, an upper battery module 10A of the module unit in one battery unit and a lower battery module 10B of the module unit in another battery unit are connected to each other via the connecting member 300A.

Figure 10:
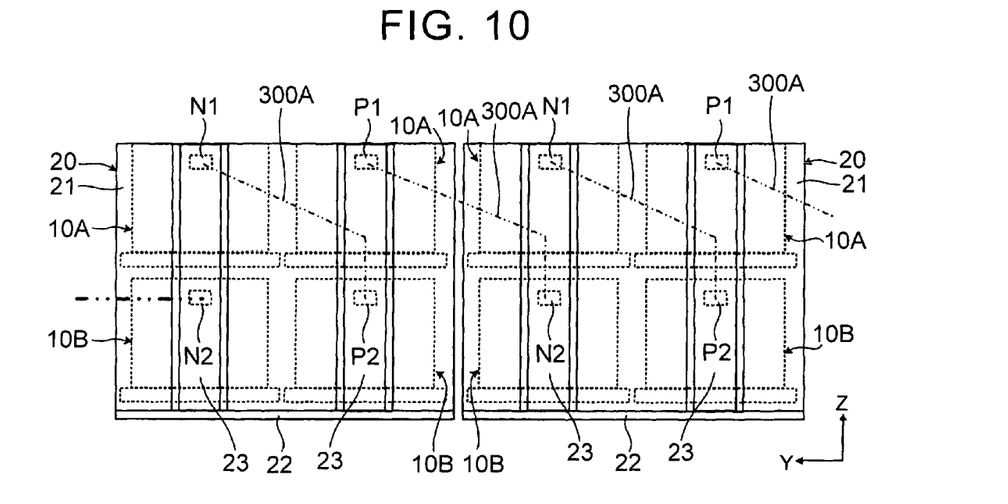
FIG. 10 is a plan view taken along Y-Z plane of FIG. 9 showing the serial connection among the battery modules and the fixing structure of the battery modules using the brackets.

FIG. 10 is a Y-Z plan view showing the serial connecting structure among the battery modules as shown in FIG. 9 and a fixing structure thereof using the brackets 20. In an example of FIG. 10, the connecting members 300A are schematically indicated by two-dot chain lines.

As shown in FIG. 10, as similar to the first variation, each battery unit is provided with the pair of brackets 20 so as to fix the battery unit to the vehicle. At this time, as shown in FIG. 7, the spaces S2 extend through the module units in the Y direction. Hence, each connecting member 300A is extended in the Y direction from the electrode terminal of the upper battery module 10A in the module unit of interest to the space S2 of the upper battery module 10A of the adjacent module unit. Each connecting member 300A is further downwardly extended toward the electrode terminal of the lower battery module 10B of the adjacent module unit through each insertion portion 23.

This configuration is the same among the battery units, and the spaces S2 extend through the different battery units in the Y direction. Hence, each connecting member 300A is extended from the electrode terminal of the upper battery module 10A of the battery unit of interest in the Y direction to the space S2 of the upper battery module 10A of the adjacent battery unit. Each connecting member 300A is further downwardly extended toward the electrode terminal of the lower battery module 10B of the adjacent battery unit through each insertion portion 23.

In the third variation, it is also possible to connect the electrode terminals of the battery modules 10A, 10B stacked in the upper and lower stages among the different module units and among the different battery units without interfering with the contact point between the end of the battery module 10 and the bracket 20.

As aforementioned, the embodiments of the present invention have been described, and in the above description, it may be unnecessary to provide each of the pair of brackets 20 with the recess-shaped insertion portion 23. For example, in FIG. 1, it is unnecessary to provide the recess-shaped insertion portion 23 to the bracket located at the other end where no connecting member 30 is disposed. However, as aforementioned, by providing each of the pair of brackets 20 with the insertion portion 23 in a rib shape extending in the Z direction, the insertion portions 23 function as reinforcing portions of the respective brackets 20, thereby enhancing the strength of the brackets 20. This configuration is the same in the aforementioned variations. In the example of FIG. 5, it may be configured that, of the two insertion portions 23 arranged side by side in the Y direction, one insertion portion 23 where no connecting member 30 is disposed may be omitted.

In the aforementioned description, the two battery modules 10A, 10B vertically stacked are both fixed to the brackets 20 so as to be fixed to the vehicle (floor panel FP) through the brackets 20, and it may be configured, for example, that although coming into contact with the bracket 20, the X-directional end of the lower battery module 10B is not fixed to the bracket 20 but is directly fixed to the vehicle. In this case, the brackets 20 are fixed only to the upper battery module 10A. In the fixing structure in which at least the upper battery module 10A is fixed to the vehicle through the brackets 20, and the lower battery module 10B disposed in a space between the upper battery module 10A and the pair of brackets 20 is directly fixed to the vehicle, it is possible to dispose the connecting member 30 used for connecting the electrode terminals between the vertically stacked battery modules 10A, 10B without interfering with the contact point between the ends of the battery module 10A and the bracket 20.

The aspect in which each bracket 20 is fixed to the floor panel FP has been explained, and it may also be configured that each bracket 20 is fixed to a frame member (vehicle body frame) included in a vehicle body.

The module unit including the battery modules 10A, 10B stacked in the upper and lower stages has been exemplified, but the module unit may be configured by stacking the battery modules 10 in three, four, or more stages. In this case, the fixing portion 21 of each bracket 20 may be formed to extend up to the electrode terminal of the battery module 10 in the uppermost stage, and similarly, the recess-shaped insertion portion 23 may be formed to extend up to the battery module 10 in the uppermost stage.

As an example of the battery module 10, such a battery set in which plural cylindrical batteries are held in the holder 12 has been exemplified, but the present invention is not limited to this. For example, a battery set in which a plurality of so-called square-type batteries are arranged in the X direction may be employed.

The battery module 10 including the holder 12 disposed at the bottom the battery module 10 has been exemplified, but the present invention is not limited to this. For example, the holder 12 may be disposed at the top of the battery module 10. In this case, the electrode terminals of the battery module 10 is disposed below the holder 12 in accordance with the holder 12 disposed at the top of the battery module 10. Accordingly, in this case, the end of the lower battery module 10B corresponds to the end of the battery module 10 located between the respective electrode terminals of the vertically stacked battery modules 10A, 10B. The connecting member 30 is vertically disposed in a manner as to outwardly bypass the end of the lower battery module 10B in the X direction through the insertion portion 23.

The invention claimed is:

1. An onboard power supply apparatus comprising:
   power storage modules each including power storage devices arranged in a plane orthogonal to a predetermined direction in which the power storage devices extend;
   a pair of brackets configured to come into contact with respective ends of the power storage modules vertically stacked so as to fix at least an upper power storage module to a vehicle; and
   an insertion portion that is disposed between at least one of the pair of brackets and an end of one of the power storage modules located between terminal portions of a vertically stacked power storage modules, a connecting member used for connecting the terminal portions of the vertically stacked power storage modules being inserted in the insertion portion, wherein
   each of the power storage modules includes: bus bars electrically connecting the power storage devices; and terminal portions connected to the bus bars so as to serve as electrode terminals of the power storage module, and
   the terminal portions are disposed at respective ends of each power storage module in a direction in which a plurality of power storage devices are arranged, wherein
   the insertion portion is a recessed portion disposed at a part of the one of the brackets in a direction apart from the end of the one power storage module, and
   the recessed portion has a rib shape extending in a stacking direction of the power storage modules.

2. The onboard power supply apparatus according to claim 1, wherein
   the one bracket includes:
   a first fixing portion fixed to the vehicle; and
   a second fixing portion coming into contact with the respective ends of the vertically stacked power storage modules, the second fixing portion provided with the insertion portion, and
   on a side of the end of the power storage module, the second fixing portion extends from the first fixing portion up to at least the terminal portion located above the end of the upper power storage module in a stacking direction of the power storage modules.

3. The onboard power supply apparatus according to claim 2, further comprising
a cover that extends from the second fixing portion toward the upper power storage module, and covers above the terminal portion of the upper power storage module.

4. The onboard power supply apparatus according to claim 1, wherein
each power storage module includes:
a holder including a plurality of apertures into which the respective power storage devices are inserted, the holder holding one ends of the power storage devices;
first bus bars including a plurality of first connecting portions formed corresponding to the respective power storage devices arranged in the plane such that the first connecting portions are connected to first end portions serving as one electrodes of the power storage devices at one ends of the power storage devices that are disposed in the holder; and
second bus bars including a plurality of second connecting portions formed corresponding to the respective power storage devices arranged in the plane such that the second connecting portions are connected to second end portions serving as the other electrodes of the power storage devices at the other ends of the power storage devices,
the terminal portions include:
a first terminal portion that is connected to the first bus bars, and is disposed at one end of the power storage module in a direction in which the plurality of power storage devices are arranged; and
a second terminal portion that is connected to the second bus bars, and is disposed at the other end of the power storage module in the direction in which the plurality of power storage devices are arranged, and
the one bracket is coupled to an end of the holder in the direction in which the plurality of power storage devices are arranged.

* * * * *